S. PEPPARD.
FRICTION-CLUTCH.

No. 185,696.  Patented Dec. 26, 1876.

WITNESSES:
H. Rydqvist
John Goethals

INVENTOR:
S. Peppard
BY Munn & Co.
ATTORNEYS.

UNITED STATES PATENT OFFICE.

SAMUEL PEPPARD, OF OSKALOOSA, KANSAS.

IMPROVEMENT IN FRICTION-CLUTCHES.

Specification forming part of Letters Patent No. 185,696, dated December 26, 1876; application filed August 28, 1876.

*To all whom it may concern:*

Figure 1:
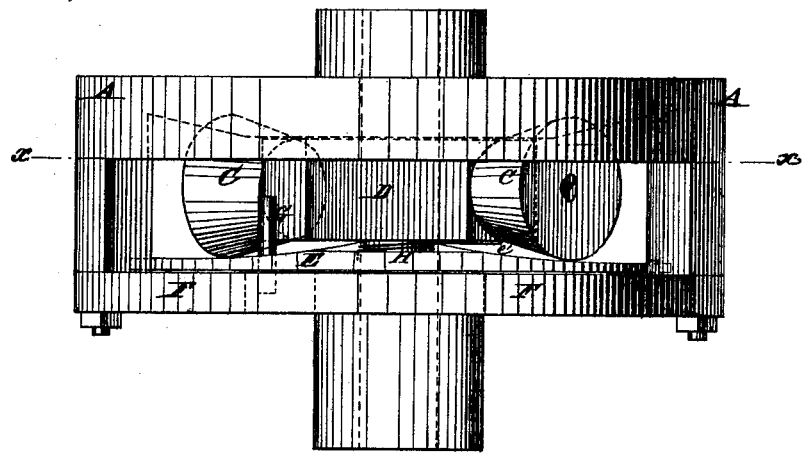
Figure 2:
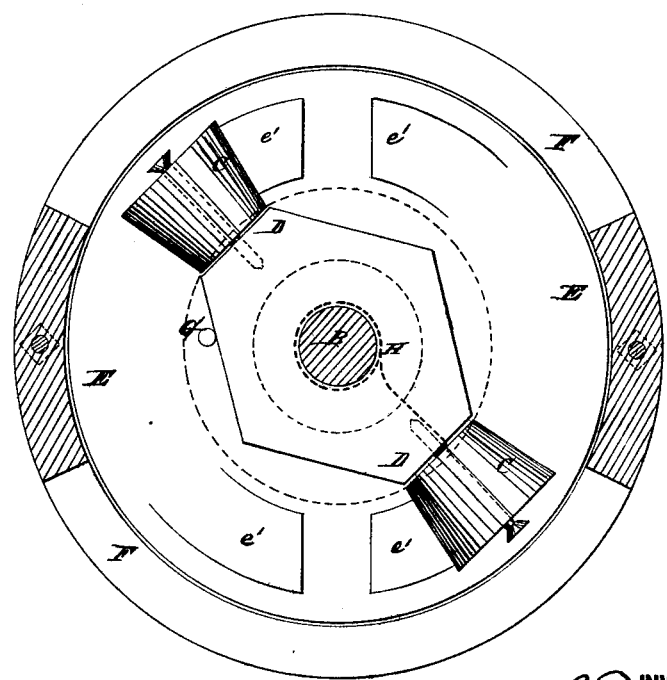

Be it known that I, SAMUEL PEPPARD, of Oskaloosa, in the county of Jefferson and State of Kansas, have invented a new and useful Improvement in Friction-Clutches, of which the following is a specification:

Figure 1 is a side view of my improved device. Fig. 2 is a detail section of the same, taken through the line $x\ x$, Fig. 1.

Similar letters of reference indicate corresponding parts.

The object of this invention is to furnish an improved device to take the place of cranks and pawls for transferring motion, which shall have no dead-point, and will act at once when the power is applied.

The invention will first be described in connection with drawing, and then pointed out in the claim.

A represents a wheel or other object to be driven, or a plate to be attached to said object. B is the main shaft. The side or face of the wheel A is made conical, to correspond with the faces of the conical rollers C, which revolve loosely upon the journals of the axle D. The middle part of the axle D is widened and has angles formed upon its opposite sides. The axle D has a hole through its center, through which the shaft B passes. E is a disk, the hub of which, to which power is applied, revolves upon the shaft B. The face of the disk E is made slightly conical, and has inclines $e'$ formed upon it, so that when the disk E is turned slightly in one direction it will be wedged by the rollers C between the wheel A and the ring F, so as to carry the said wheel with it in its revolution. The ring F is securely bolted to the wheel A. The play of the rollers C upon the disk E is limited by a pin, G, passed through the disk E in such a position as to pass down at one side of the angle of the axle D. The rollers C are also held forward in such a position as to be quickly acted upon by the inclines $e'$ by a coiled spring, H, one end of which is attached to the axle D, and its other end is attached to the disk E.

Having thus described my invention, I claim as new and desire to secure by Letters Patent—

The combination of the side-grooved transmitter A, the loose axle D, having rollers C, and the driving-disk E, having stud G, and inclines $e'$, all arranged substantially as and for the purpose specified.

SAMUEL PEPPARD.

Witnesses:
GEORGE DAVIS,
E. T. ELLIS.